(12) United States Patent
Kim et al.

(10) Patent No.: US 7,005,084 B2
(45) Date of Patent: Feb. 28, 2006

(54) THERMOLUMINESCENT DETECTOR OF LIF CONTAINING MG, CU, NA AND SI AS DOPANTS AND ITS PREPARATION

(75) Inventors: Jang-Lyul Kim, Taejon-si (KR); Si-Young Chang, Taejon-si (KR); Jung-Il Lee, Taejon-si (KR); Jeong-Sun Yang, Jejudo (KR); Young-Mi Nam, Taejon-si (KR)

(73) Assignee: Korea Atomic Energy Research Institute, Taejon-si (KR)

( * ) Notice: Subject to any disclaimer, the term of this patent is extended or adjusted under 35 U.S.C. 154(b) by 94 days.

(21) Appl. No.: 10/239,317

(22) PCT Filed: Jan. 12, 2002

(86) PCT No.: PCT/KR02/00052

§ 371 (c)(1),
(2), (4) Date: Sep. 19, 2002

(87) PCT Pub. No.: WO03/056359

PCT Pub. Date: Jul. 10, 2003

(65) Prior Publication Data

US 2003/0157005 A1    Aug. 21, 2003

(30) Foreign Application Priority Data

Dec. 24, 2001    (KR)    ............... 10-2001-0084352

(51) Int. Cl.
    *C09K 11/08*    (2006.01)
    *C01D 15/04*    (2006.01)
    *G01T 1/11*    (2006.01)

(52) U.S. Cl. .............. 252/301.4 H; 252/301.4 R; 252/301.6 S; 252/600

(58) Field of Classification Search ........... 252/600, 252/301.4 R, 301.4 H, 301.6 S; 501/13
See application file for complete search history.

(56) References Cited

U.S. PATENT DOCUMENTS

| 5,340,985 A | 8/1994 | Liu ........................ 250/337 |
| 5,500,529 A | 3/1996 | Tawil et al. ............. 250/337 |
| 5,622,659 A | 4/1997 | Spicuzza .................. 264/21 |

FOREIGN PATENT DOCUMENTS

| KR | 2000-0066664 | * 11/2000 |
| WO | WO 03/056359 A1 | * 7/2003 |

OTHER PUBLICATIONS

KR 1020000066664 abstract, Korean Patent Abstracts (KR), Internet, <http://patent.kipris.or.kr/bin/Kpa>, 2 pages, (Oct. 2003).*

PTO 04-0001, English language Translation of KR 2000-0066664 A, USPTO, Alexandria, Virginia, (Oct. 2003), title page and pp. 1-14.*

* cited by examiner

*Primary Examiner*—Daniel S. Metzmaier
(74) *Attorney, Agent, or Firm*—Bachman & LaPointe, P.C.

(57) ABSTRACT

The disclosure concerns a pellet type LiF element for a thermoluminescent dosimetry (TLD) and its preparation. More particularly, the disclosure concerns the pellet type LiF element for a thermoluminescent dosimetry (TLD) which includes 0.35~0.12% by mole of Mg source; 0.08~0.001% by mole of Cu source; 1.3~0.5% by mole of Na source; and 1.3~0.5% by mole of Si source as dopants. The pellet type LiF element according to the present invention shows excellent sensitivity and has the preferred glow curve with a simple and single main peak.

7 Claims, 6 Drawing Sheets

THERMOLUMINESCENT DETECTOR OF LIF CONTAINING MG, CU, NA AND SI AS DOPANTS AND ITS PREPARATION

FIELD OF THE INVENTION

The present invention relates to a pellet-type LiF element for a thermoluminescent dosimetry (TLD) and its preparation. More particularly, to the pellet-type LiF element for a thermoluminescent dosimetry (TLD) including 0.35~0.12% by mole of Mg source; 0.08~0.001% by mole of Cu source; 1.3~0.5% by mole of Na source; and 1.3~0.5% by mole of Si source as dopants and its preparation.

BACKGROUND OF THE INVENTION

In order to detect radiation, many different principles are used in various types of radiation detectors depending on the application field and the range. For example, there are several devices including a gas filled counter using the method of electrolytic dissociation of vapor molecules by radiation; a semiconductor detector using the method of generating electron-hole pair from semiconductor exposed to radiation; a scintillation counter using materials that emit light when exposed to radiation; a film badge using the reaction of films to radiation; and a thermoluminescence dosimeter (hereinafter, referred to as "TLD") using the method of irradiating an insulator or a semiconductor so as to get thermostimulated and become luminescent.

Among the various radiation detectors, the TLD is widely used as a radiation detector to measure the personal exposed dose. In the thermoluminescence process, when an insulator or a semiconductor is irradiated by high-energy radiation from the exterior, electrons in the valence band are excited to the conduction band. Some of the electrons go back to the valence band in a very short period of time, however, some other electrons stay in the trapping level of energy in the forbidden band due to impurity and defect of the solid. If there is no thermal disturbance, the electrons in the trapping level accumulate radiation doses in a stable energy state for a long period of time. Using this property, the accumulated radiation dose can be measured, thus enabling management of the radiation dose accumulated inside the body of a worker exposed to radiation in an environment of high radiation, and the monitoring of an environment dose as well.

However, if the electrons take thermal energy from the exterior, they no longer remain in the trapping level, and they go up to the conduction band. At that stage, the electrons react with holes in the recombining level in the forbidden band, and generate the corresponding energy of light, which can be utilized as dosimeter since the amount of luminescence of the light is proportionate to the radiation dose in a certain region. Using the light emitted at this stage, a personal exposed dose can be measured or can be used medically for diagnosis and treatment of a patient.

In order to prepare a high-quality TLD, the thermoluminescent elements comprising of thermoluminescent materials should have excellent sensitivity to sufficiently low radiation, and have the most preferred glow curve structure.

In accordance with ICRP 60 [ICRP, 1990 Recommendations of the International Commission on Radiological Protection, ICRP Publication 60, Pergamon Press, Oxford, New York, 1990], it is necessary for the thermoluminescent materials to be highly sensitive to a radiation dose as low as reasonably achievable (ALARA).

The glow curve represents the relative thermoluminescent intensity corresponding to the heat stimulus temperature. The information of the radiation dose is generally extracted from the integral area under the glow curve. That is, since the area of the glow curve means the amount of luminescence and the amount is proportionate to the radiation dose, the area of the glow curve appears as the accumulated radiation through the radiation evaluation algorithm including various compensating values.

Thermoluminescence is a phenomenon wherein some of irradiated electrons stabilize in the trapping level, and then, when heated, emit light. Electrons corresponding to the luminescence peak that are generated in the low temperature area can be easily excited even in room temperature. This result means the possibility that the electrons might get excited in room temperature increases, as the temperature of the luminescence peak gets lower.

Even though one of the important advantages of a TLD is the ability to evaluate the accumulated radiation dose, a TLD having a luminescent peak in the low temperature area does not satisfy the requirement and loses reliance as a radiation detector. Because the TLD cannot maintain complete information on the dose of radiation, but loses some of the information when it is irradiated and stays in room temperature for a certain period of time.

Therefore, the preferred glow curve characteristics, i.e., the location of the main glow peak and its width, should appear in the high temperature area rather than in the low temperature area, and have a simple and single main peak, and, at the same time, no peak should be found in the low temperature area if possible.

Recently, there are many researches to develop thermoluminescent materials that have high sensitivity to sufficiently low radiation and show a glow curve with a simple and single main peak.

The glow curve structure greatly depends on the state of the trapping level in the forbidden band formed by the types or the concentrations of the added impurities. In order to obtain the most preferable thermoluminescent materials, the optimum types or their concentrations of impurities should be found.

A well-established and widely employed dosimetry technique is thermoluminescence dosimetry (TLD) using LiF as the host material. Presently, America, China, Poland, and France take the initiative to research into LiF elements. Depending on the purpose, they might be classified to a powder type or a pellet type. Examples of such LiF elements for a TLD are GR-200A comprised of LiF:Mg,Cu,P composition which is commercialized in China and MCP-N comprised of LiF:Mg,Cu,P composition which is commercialized in Poland. Recently, the compositions of these commercially available TLDs, LiF:Mg,Cu,P, are spotlighted.

The present inventors had already prepared a powder type LiF element for a TLD, showing high sensitivity and a simple and single main peak, which includes 0~1.0 mole % of Mg source; 0~1.0 mole % of Cu source; 0~2.4 mole % of Na source; and 0~2.4 mole % of Si source as dopants in LiF.

However, when the powder type LiF element having high sensitivity goes through a solidifying process, in which the powder type is changed into the pellet type by sintering, it cannot maintain its sensitivity. Therefore, most of thermoluminescent elements should be produced by a continuous process, from the starting elements to the final product of a pellet type.

The present inventors have prepared a pellet-type LiF element for a TLD which includes 0.35~0.12% by mole of Mg source; 0.08~0.001% by mole of Cu source; 1.3~0.5% by mole of Na source; and 1.3~0.5% by mole of Si source as dopants. The pellet-type LiF element according to the present invention shows high sensitivity to sufficiently low radiation and the most preferable glow curve.

SUMMARY OF THE INVENTION

An object of the present invention is to provide a pellet-type LiF element for a thermoluminescent dosimetry (TLD) which includes 0.35~0.12% by mole of Mg source; 0.08~0.001% by mole of Cu source; 1.3~0.5% by mole of Na source; and 1.3~0.5% by mole of Si source as dopants, that is produced by compressing, sintering the powder type of LiF element, cooling, and annealing.

Another object of the present invention is to provide a method of the preparation of the pellet-type LiF element for a thermoluminescent dosimetry (TLD).

BRIEF DESCRIPTION OF THE DRAWINGS

The above and other objects, features and other advantages of the present invention will be more clearly understood from the following detailed descriptions taken in conjunction with the accompanying drawings, in which.

DETAILED DESCRIPTION OF THE INVENTION

Figure 1:
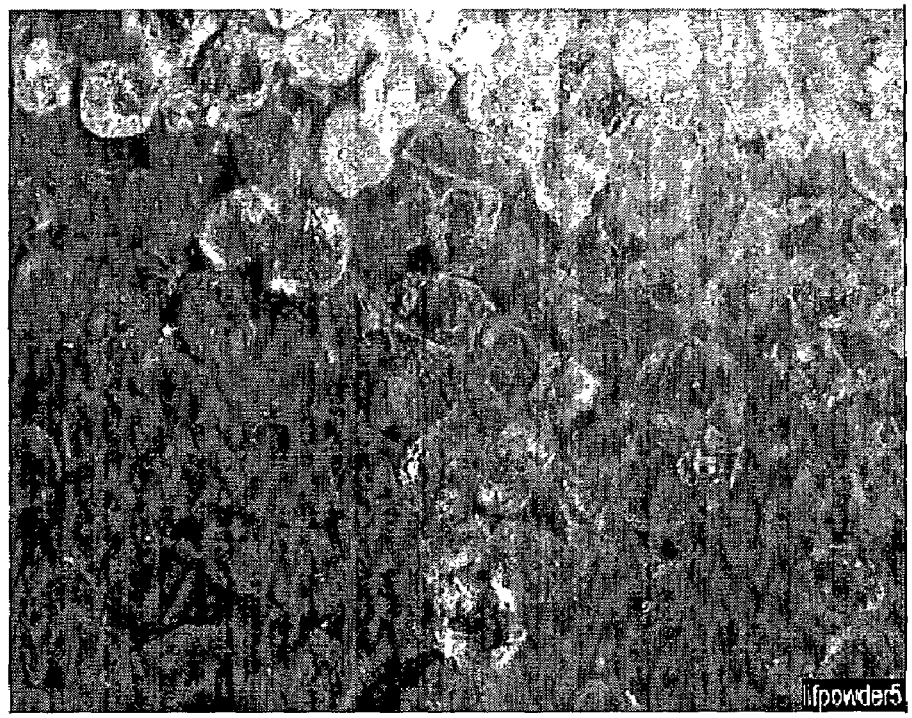
FIG. 1 shows a microphotograph illustrating the surface of the powder type LiF element in the comparative example 1.

The glow curve structure greatly depends on the state of the trapping level in the forbidden band that is formed by the types or the concentrations of the added impurities. Therefore, the types and the concentrations of the impurities significantly affect the efficacy of the final LiF element as well as the relative TL intensity.

Therefore, the present invention provides a pellet type LiF element for a TLD which includes 0.35~0.12% by mole of Mg source; 0.08~0.001% by mole of Cu source; 1.3~0.5% by mole of Na source; and 1.3~0.5% by mole of Si source as dopants.

The pellet type LiF element of the present invention can use any ionic compounds consisting of Mg sources, Cu sources, Na sources, and Si sources.

More particularly, the "Mg source" used herein means to provide an $Mg^{2+}$ ion to the LiF element as host material. For example, the Mg source is selected from the group consisting of magnesium sulfate, magnesium chloride, magnesium fluoride, and magnesium oxide. Magnesium sulfate is more preferred.

The "Cu source" used herein means to provide a $Cu^{2+}$ ion to the LiF element as host material. For example, there are copper sulfate, copper nitrate, copper oxide, and copper chloride, and it is preferred to use copper sulfate.

The "Na source" or "Si source" used herein is defined to provide a $Na^+$ ion or a $Si^{4+}$ ion to the LiF element. For example, there are NaCl and $SiCl_4$, and more preferred is $Na_2SiO_3$, or $Na_2O.2SiO_2.9H_2O$ that provides both the $Na^+$ ion and the $Si^{4+}$ ion simultaneously.

The present invention provides the method of producing a pellet-type LiF element for a thermoluminescent dosimetry (TLD), which comprises;
 1) compressing the powder type LiF element which includes 0.35~0.12% by mole of Mg source; 0.08~0.001% by mole of Cu source; 1.3~0.5% by mole of Na source; and 1.3~0.5% by mole of Si source as dopants,
 2) sintering the powder type LiF element under a nitrogen atmosphere at the temperature of 760~840° C.,
 3) Cooling the sintered material, and annealing at the temperature of 240~290° C.

The powder type LiF element for a TLD which includes 0.35~0.12% by mole of Mg source; 0.08~0.001% by mole of Cu source; 1.3~0.5% by mole of Na source; and 1.3~0.5% by mole of Si source as dopants is produced by mixing the compounds; activating them so as to obtain crystals; and cooling and pulverizing the crystals.

The activation is the step wherein the dopants are sufficiently diffused into the LiF crystals. More particularly, the added compositions are melted at a specific temperature and heated for a period of time to the melting point, until the crystals grows to the diameter of 100~300 μm, thus growing microcrystallines.

After the activation, the powder type LiF element goes through the room-temperature quick-cooling step, which can quickly cool the hot crystals. The room-temperature quick-cooling method is carried out by cooling the crystals in the air, or using a metal plate such as a frozen aluminum or a copper plate.

Continuously, the microcrystallines are rinsed with 1 N hydrochloric acid to remove impurities inside the crystals, and then, the hydrochloric acid in the crystals is removed by washing with water. In addition, a volatile organic solvent, which can be any organic solvent with a low boiling point and low viscosity, preferably, acetone or ethanol dries the purified crystals.

Finally, the powder type LiF element is produced by pulverizing the crystals and then by filtering using the reference sieve. The grain size of the crystals is preferably 80~200 μm.

The first step of the method of the present invention, which is compressing the powder type LiF elements obtained as above, various sizes and shapes can be chosen depending on the use. For example, there are a rod type, a square chip type, and a pellet type depending on molds used.

In the example of the present invention, a pellet type LiF element for a TLD was fabricated with 4.5 mm in diameter and 0.8 mm in thickness by pressurizing in room temperature the pulverized powder of the crystals in a mold of 4.5 mm in diameter with 7~13 ton of press pressure.

To increase the mechanical intensity of the LiF elements and to make it have the most preferable glow curve for a TLD, the sintering step follows under a nitrogen atmosphere at a temperature of 760~840° C., preferably, 800~825° C. The sintering step usually takes 10~20 minutes, which can be changed depending on the sintering temperature.

The annealing step, which is the last step for preparing the pellet type LiF element, is to sufficiently diffuse the dopants into the LiF crystals as host materials, resulting in improving the glow curve structure and increasing stability for a period time.

Figure 5:
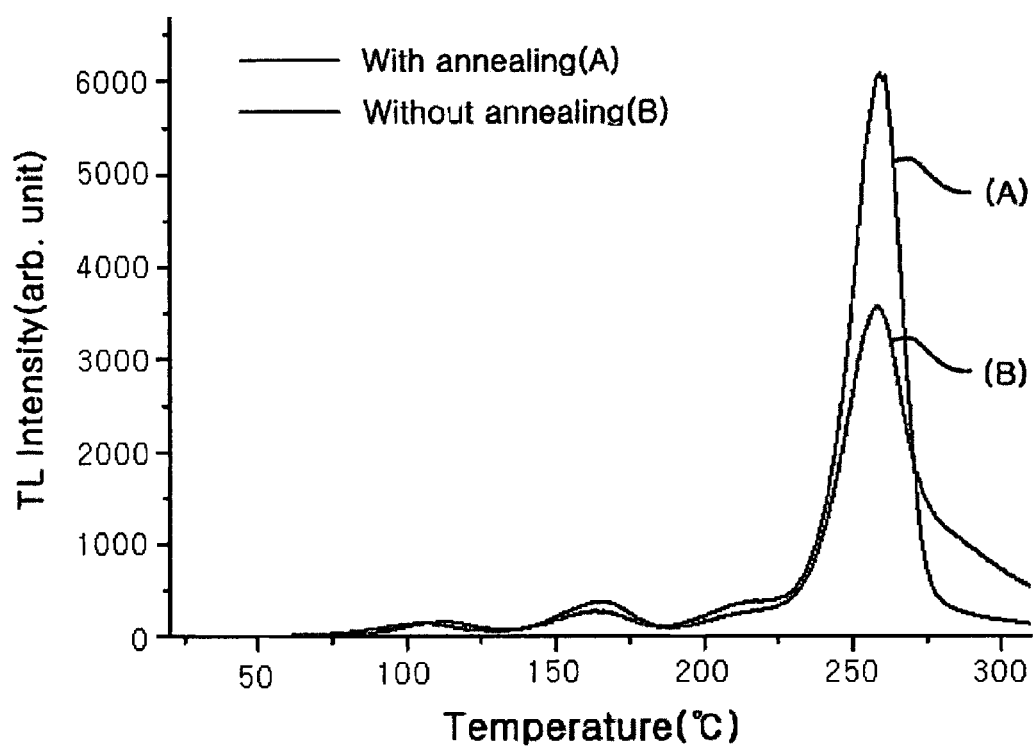
FIG. 5 illustrates the influence of the annealing step in the process of the TLD on the glow curve structure.

With annealing, the glow curve denoted (A) structure shows a simple and single main peak in the high temperature compared to the glow curve denoted (B) structure without annealing. The result is shown in FIG. 5. Therefore, it is confirmed that the annealing step plays a most important role in obtaining the preferred glow curve structure. The annealing temperature is 240~290° C., preferably, 250~270° C. for 5~30 minutes which can also be changed depending on the annealing temperature.

The characteristics of the LiF elements for a TLD can be observed, which is prepared in the example 1 and in the comparative example 1 with the same composition of 0.35~0.12% by mole of Mg source; 0.08~0.001% by mole of Cu source; 1.3~0.5% by mole of Na source; and 1.3~0.5% by mole of Si source as dopants, but with different concentrations.

FIG. 1 shows a microphotograph illustrating the surface of the powder type LiE element for a TLD in the comparative example 1 with the same composition but with a range of different concentrations of the present invention. In general, if the dopants are sufficiently diffused into the crystals, transparent grains are observed. From the result of FIG. 1, some bluish ones are also observed around the crystals because the dopants are simply attached to the surface of the crystals, and are not diffused into the LiF crystals.

Figure 2:
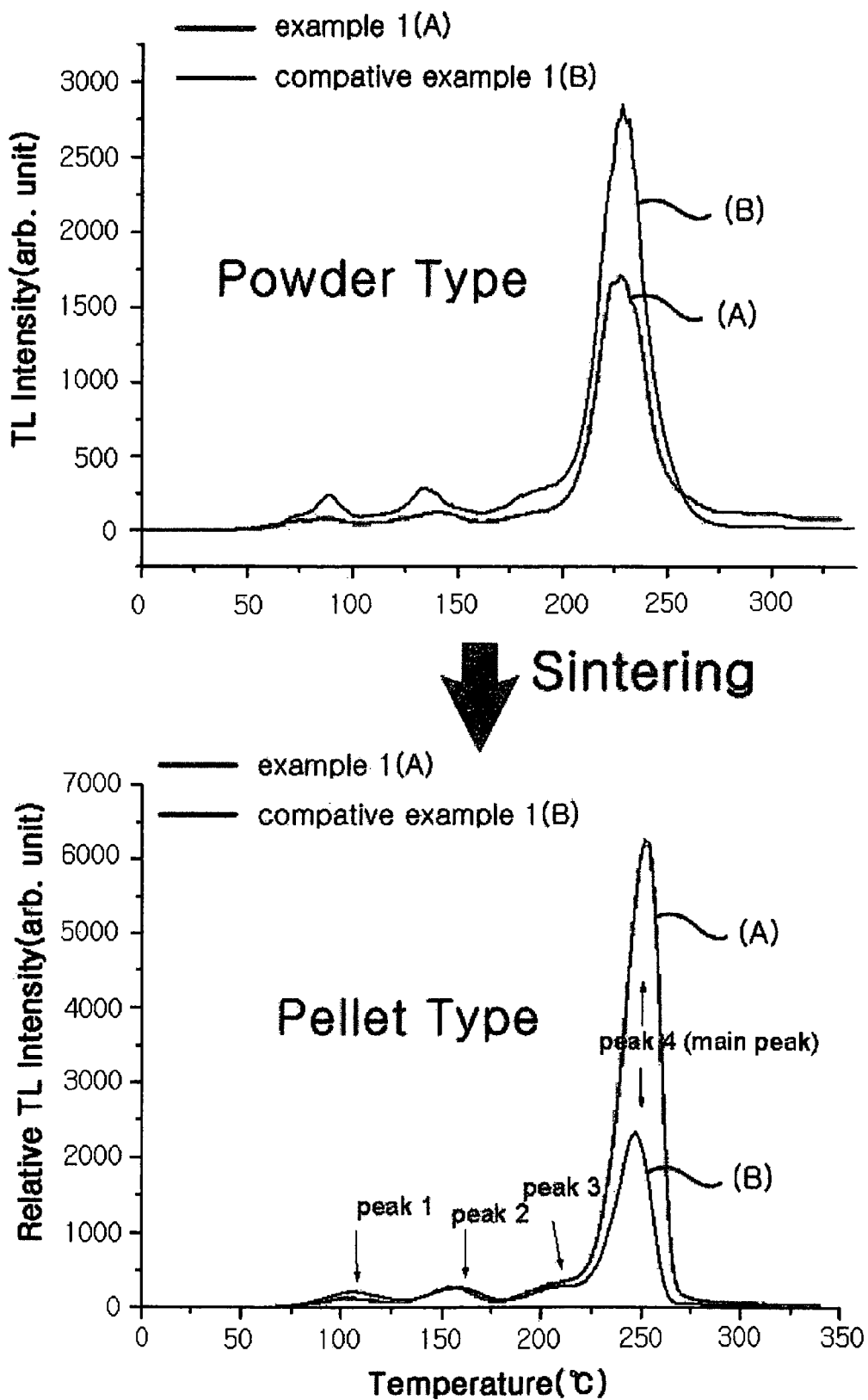
FIG. 2 illustrates the observation of the glow curve in accordance with the process from the powder type to the pellet type LiF element.

FIG. 2 illustrates the glow curves, denoted (A) and (B), in accordance with the process from the powder type to the pellet type of elements.

In FIG. 2, the line denoted (B) represents the powder type LiF element in the comparative example 1, which shows better sensitivity than that of the example 1 denoted as (A). However, in accordance with the solidifying process, in which the powder type is changed into the pellet type by sintering, the element is observed noticeably decreased its sensitivity. The powder type LiF element in the example 1, on the other hand, shows relatively low sensitivity. However, after the sintering, the pellet type LiF element has largely improved sensitivity as well as a simple and single main peak in the high temperature area.

Therefore, according to the method of preparing a LiF element for a TLD, it greatly affects on the sensitivity of LiF elements. Thus, it can be concluded that the preferred process of preparing LiF elements should be carried out a continuous process from the powder type to the pellet type so as to obtain LiF elements with excellent sensitivity.

Figure 3A:
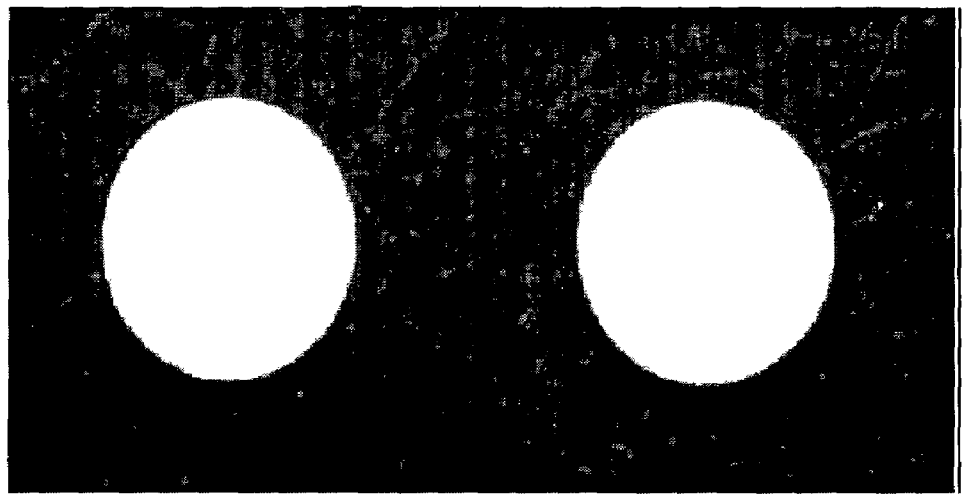
FIG. 3a shows a pellet type LiF element prepared in the example 1.
Figure 3B:
FIG. 3b shows a pellet type LiF element prepared in the comparative example 1.

FIG. 3a shows the pellet type LiF element in the example 1 of the present invention which has no bluish substances on the surface, while FIG. 3b shows the pellet type LiF element in the comparative example 1, appears entirely bluish.

From the above result, it can be recognized that the pellet type LiF element for a TLD, with dopants such as 0.35~0.12% by mole of Mg source; 0.08~0.001% by mole of Cu source; 1.3~0.5% by mole of Na source; and 1.3~0.5% by mole of Si source as the preferred embodiment of the present invention, has diffused evenly into the LiF crystals, and so has a white color.

Figure 4:
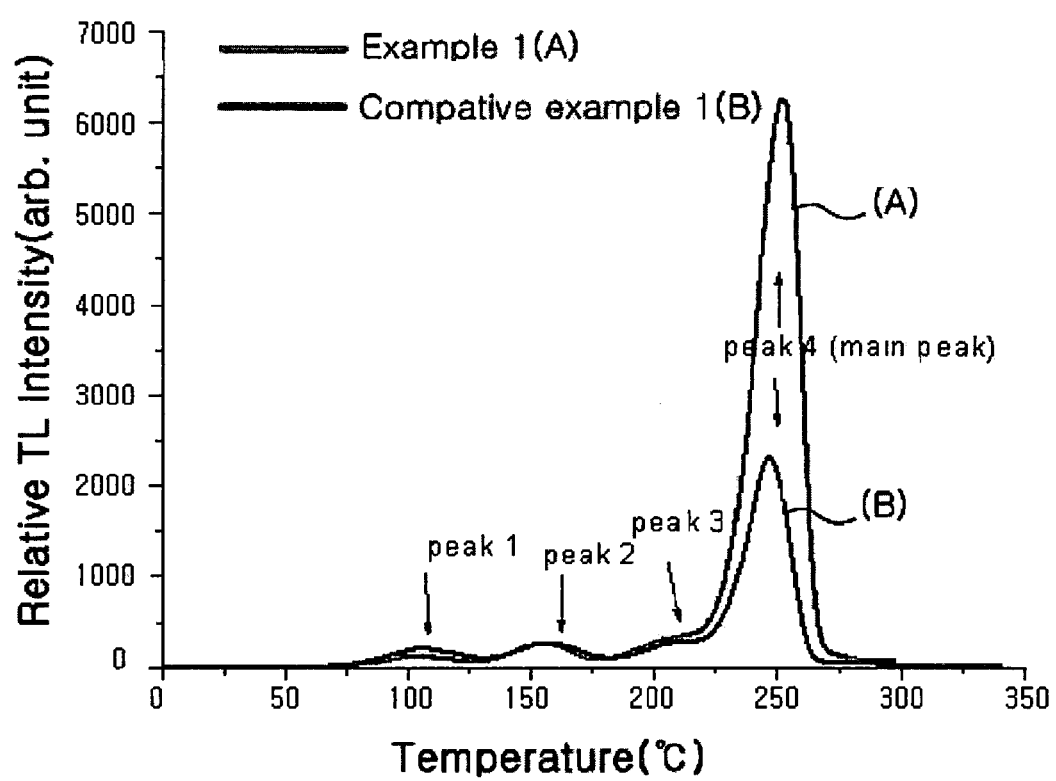
FIG. 4 illustrates the comparison of the glow curves of the LiF elements in the example 1 and the comparative example 1.

FIG. 4 illustrates the result of comparing the glow curves of the pellet type LiF elements in the example 1 denoted as (A) and in the comparative example 1 denoted as (B).

The pellet type LiF element in the example 1 has smaller areas of the peak in the low temperature area, and by contrast, has a simple and single main peak in the high temperature area, which is the preferred glow curve structure.

In addition, the peak ratio of the low temperature area to the high temperature area, is 22.9 in the example 1 and is 8.6 in the comparative example 1, thus confirming that the range of the concentration based on the composition of the present invention is the optimum condition for the production of an excellent LiF element.

Figure 6:
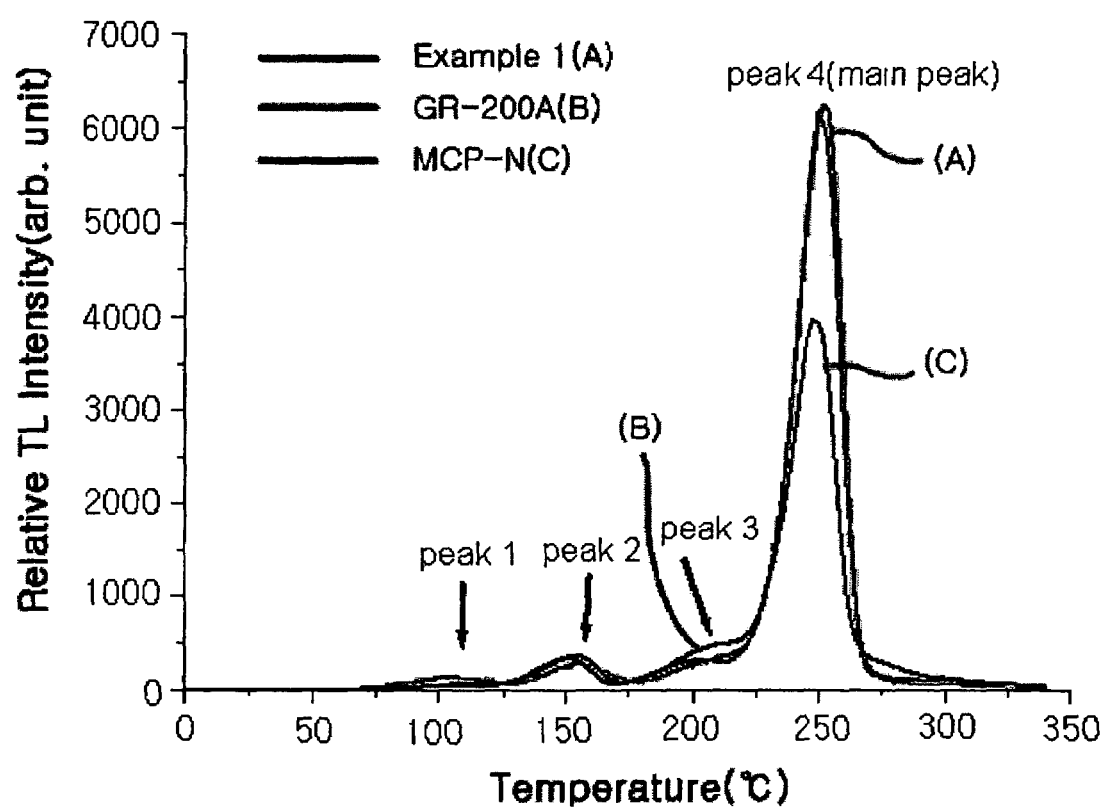
FIG. 6 illustrates the comparison of the glow curves of the commercially available TLDs and the LiE element for the TLD of the present invention.

FIG. 6 illustrates the result of comparing the glow curve structures denoted as (A), (B) and (C) between the commercially available TLDs, including MCP-N denoted as (C) in Poland and GR-200A denoted as (B) in China and the LiF element for a TLD of the present invention denoted as (A) on the same weight. The LiF element of the present invention which includes 0.35~0.12% by mole of Mg source; 0.08~0.001% by mole of Cu source; 1.3~0.5% by mole of Na source; and 1.3~0.5% by mole of Si source as dopants shows the most preferred glow curve structure with a simple and single main peak in the high temperature area.

In addition, the peak ratio of the low temperature area to the high temperature area is 22.9 in the LiF element of the present invention, shows much better sensitivity and the preferred glow curve than that of MCP-N which is a maximum of 11.6 and GR-200A which is a maximum of 16.9.

The sensitivity of the LiF element of the present invention is determined by the peak ratio of the low temperature area to the high temperature area. More particularly, the peak ratio is calculated with the formula of the peak in the high temperature area 4/the low temperature area 2 or the high temperature area 4/the low temperature area 3, except for the lowest temperature area 1.

A better understanding of the present invention may be obtained in light of the following examples which are set forth to illustrate, but are not to be construed to limit the present invention.

EXAMPLE 1

Production of a Pellet Type LiF Element 1

Against 99.9% of the LiF, 0.2 mole % of $MgSO_4.7H_2O$, 0.05 mole % of $CuSO_4.5H_2O$, and 0.45 mole % of $Na_2O.2SiO_2.9H_2O$ were exactly measured and mixed with distilled water. The mixture of LiF and dopants as above were dried, activated in a platinum crucible to obtain crystals and then sintered in an electronic furnace at a temperature of 815° C. under a nitrogen atmosphere. After the mixture was sintered, the crystals were quickly cooled on a previously prepared aluminum plate at −20° C. and then the crystals were pulverized.

The pulverized crystals were immersed in a 1 N HCl solution for 10 minutes, washed with acetone and then dried. By filtering with the reference sieve, the crystals of the grain size under 80~200 $\mu$m were selected and abstracted. The abstracted crystals were fabricated 4.5 mm in diameter and 0.8 mm in thickness by pressurizing the pulverized powder of the crystals using a mold of 4.5 mm in diameter with 10 tons of press pressure. The compressed material was put in a platinum crucible and then sintered for 15 minutes within an electronic furnace at 820° C. under a nitrogen atmosphere with 3 liter of nitrogen per minute.

The sintered material was cooled on a previously prepared aluminum plate at −20° C., and then annealed for 10 minutes in an electronic furnace at 260° C., after which the material was cooled again in room temperature to produce a pellet type LiF element.

EXAMPLES 2

Production of a Pellet Type LiF Element 2~8

The pellet type LiF elements in the example 2~8 were prepared in the same manner and under the same conditions as in the example 1, except for a change only in the concentration of $MgSO_4.7H_2O$, $CuSO_4.5H_2O$, and $Na_2O.2SiO_2.9H_2O$ against 99.9% of the LiF element as described in Table 1 below.

TABLE 1

Production of various pellet type LiF elements

|  | Mg | Cu | Na | Si |
|---|---|---|---|---|
| Example 1 | 0.20 | 0.05 | 0.45 | 0.45 |
| Example 2 | 0.20 | 0.01 | 0.45 | 0.45 |
| Example 3 | 0.20 | 0.001 | 0.45 | 0.45 |
| Example 4 | 0.12 | 0.01 | 0.45 | 0.45 |
| Example 5 | 0.35 | 0.01 | 0.45 | 0.45 |
| Example 6 | 0.20 | 0.001 | 0.45 | 0.45 |
| Example 7 | 0.20 | 0.005 | 1.30 | 1.30 |
| Example 8 | 0.20 | 0.001 | 1.30 | 1.30 |

COMPARATIVE EXAMPLE 1

Production of a Pellet Type LiF element

Against 99.9% of the LiF, 0.6 mole % of $MgSO_4.7H_2O$, 0.8 mole % of $CuSO_4.5H_2O$, and 1.80 mole % of $Na_2SiO_3.9H_2O$ were exactly measured and mixed with distilled water. The mixed solution of LiF and dopants was dried, put in a platinum crucible and then sintered in an electronic furnace at a temperature of 815° C. under a nitrogen atmosphere. After the mixture was sintered, the crystals were quickly cooled and then pulverized.

The pulverized crystals were immersed in a 1 N HCl solution for 10 minutes, and then particles under the grain size of 80 μm were selected by filtering with the reference sieve. The abstracted crystals were fabricated 4.5 mm in diameter and 0.8 mm in thickness using a mold of 4.5 mm in diameter with 10 tons of press pressure. The compressed material was put in a platinum crucible and then sintered for 60 minutes within an electronic furnace at 820° C. under a nitrogen atmosphere with 3 liter of nitrogen per minute.

In order to investigate the characteristics of the LiF element in the example 1 and in the comparative example 1 with the same composition but with a range of different concentrations, experiments described below were carried out.

EXPERIMENTAL EXAMPLE 1

Observation of the Surface of the LiF Element

In order to compare the surfaces of LiF elements fabricated respectively in the example 1 and in the comparative example 1 with same composition but with a range of different the concentrations, a microphotograph, Nikon EPI-PHOT200 was used with ×200 magnification.

FIG. 1 illustrates the surface of the powder type the LiF element in the comparative example 1. As shown in FIG. 1, some bluish substances were observed around the crystals because the dopants were insufficiently diffused into the LiF crystals, and the dopants were simply attached to the surface of the crystals. Whereas, the transparent grains can also be observed when the dopants were diffused into the inside of the crystals FIG. 3a shows the pellet type LiF element in the example 1 which is entirely white color with no bluish substances on the surface, and FIG. 3b shows that the whole element is mostly bluish in the comparative example 1.

From the result, it can be known that the characteristics of the LiF elements for a TLD make a large difference depending on the change in the concentration based on same composition consisting of Mg source, Cu source, Na source and Si source.

Therefore, it has been assured that the concentration as well as the composition of the present invention are preferred for obtaining excellent characteristics of a LiF element, which is white color because the dopants were sufficiently diffused into LiF crystals.

EXPERIMENT EXAMPLE 2

Comparison of the Glow Curves

The glow curves of the LiF element prepared in the example 1 and in the comparative example 1 were measured by the following methods.

The LiF elements prepared in the example 1 and in the comparative example 1 were 28 mg respectively, and 6.7 mGy dose was irradiated using Reference Dose Irradiator 6527B of Studsvik Co. (Sweden), after which the glow curve was measured by heating linearly at the rate of 10° C./sec using a TLD deciphering device of Teledyne System 310 (America).

FIG. 4 illustrates the comparison of the glow curves of the LiF elements prepared in the example 1 and in the comparative example 1. The pellet type LiF element in the example 1 had smaller areas of the peak in the low temperature area, by contrast, had a simple and single main peak in the high temperature area, which is the preferred glow curve structure.

TABLE 2

Comparison of sensitivity of the LiF elements I

| Element | Example 1 | Comparative example 1 |
|---|---|---|
| Height of Peak 2 | 273 | 268 |
| Height of Peak 3 | 296 | 265 |
| Height of Peak (main peak) 4 | 6258 | 2320 |
| Peak ratio of Peak 4/Peak 2 | 22.9 | 8.7 |
| Peak ratio of Peak 4/Peak 3 | 21.1 | 8.8 |

As in Table 2, the peak ratio of the LiF element prepared in the example 1 was a maximum of 22.9, whereas in the comparative example 1 was a maximum of 8.8, which indicates an improved result almost by 3 times. From the result, it can be assured that a high-quality LiF element should be prepared within the range of the concentration and the composition of the present invention, including 0.35~0.12% by mole of Mg source; 0.08~0.001% by mole of Cu source; 1.3~0.5% by mole of Na source; and 1.3~0.5% by mole of Si source as dopants.

EXPERIMENT EXAMPLE 3

Comparison of the Glow Curve Structures of the Commercial Available TLDs and the LiF Element of the Present Invention In order to compare the glow curve structures of the commercially available TLDs and the LiF element of the present invention, the comparison was carried out in the same manner and under the same conditions as in the experiment example 2.

The glow curves of the commercially available TLDs and the LiF element of the present invention with the optimum composition and the concentration were compared under the condition of the same mass. As indicated in FIG. 6, compared to MCP-N and to GR-200A, the LiF element prepared in the example 1 showed a smaller peak in the low temperature area and a simple and single main peak in the high temperature area, which is the preferred glow curve structure.

TABLE 3

Comparison of sensitivity of the LiF elements II

| Element | Example 1 | GR-200A | MCP-N |
|---|---|---|---|
| Height of Peak 2 | 273 | 366 | 340 |
| Height of Peak 3 | 296 | 436 | 320 |
| Height of Peak (main peak) 4 | 6258 | 6183 | 3947 |
| Peak ratio of peak 4/Peak 2 | 22.9 | 16.9 | 11.6 |
| Peak ratio of peak 4/Peak 3 | 21.1 | 14.2 | 12.3 |

As described in Table 3, the peak ratio was respectively, a maximum of 12.3 for MCP-N, a maximum of 16.9 for GR-200A and a maximum of 22.9 for the LiF element prepared in example 1 of the present invention, from which it can be known that the LiF element of the present invention is most excellent than MCP-N or GR-200A.

What is claimed is:

1. A pellet-type LiF element of pellet form for a thermoluminescent dosimetry (TLD) which includes 0.35–0.12% by mole of Mg source; 0.08–0.001% by mole of Cu source; 1.3–0.5% by mole of Na source; and 1.3–0.5% by mole of Si source as dopants, wherein a pellet-type LiF element is produced by sequentially compressing a powder type LiF element, sintering, cooling, and annealing by heating at an annealing temperature between 240–290° C.

2. A method of making the LiF element of claim 1, comprising the steps of:
   1) compressing the powder that includes 0.35~0.12% by mole of Mg source; 0.08~0.001% by mole of Cu source; 1.3~0.5% by mole of Na source; and 1.3~0.5% by mole of Si source as dopants,
   2) sintering the powder under a nitrogen atmosphere at the temperature of 760~840° C.,
   3) cooling the sintered material, and annealing at the temperature of 240~290° C. to produce the LiF element.

3. The method according to claim 2, wherein the Mg source is selected from the group consisting of magnesium sulfate, magnesium chloride, magnesium fluoride, and magnesium oxide.

4. The method according to claim 2, wherein the Cu source is selected from the group consisting of copper sulfate, copper nitrate, copper oxide, and copper chloride.

5. The method according to claim 2, wherein the Na source or Si source is selected from the group consisting of NaCl, $SiCl_4$, $Na_2SiO_3$ and $Na_2O.2SiO_2.9H_2O$.

6. The method according to claim 2, wherein the grain size of the powder in step (1) is 80~200 µm.

7. The method according to claim 2, wherein the sintering in step (2) is carried out at the temperature of 800~825° C.

* * * * *